United States Patent
Ishizaki (10) Patent No.: US 11,398,004 B2
(45) Date of Patent: *Jul. 26, 2022

(54) ALLOCATING DEVICE BUFFER ON GPGPU FOR AN OBJECT WITH METADATA USING ACCESS BOUNDARY ALIGNMENT

(71) Applicant: INTERNATIONAL BUSINESS MACHINES CORPORATION, Armonk, NY (US)

(72) Inventor: Kazuaki Ishizaki, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/665,838

(22) Filed: Oct. 28, 2019

(65) Prior Publication Data

US 2020/0058095 A1 Feb. 20, 2020

Related U.S. Application Data (63) Continuation of application No. 14/931,096, filed on Nov. 3, 2015, now Pat. No. 10,515,430.

(51) Int. Cl.
*G06T 1/20* (2006.01)
*G06T 1/60* (2006.01)

(52) U.S. Cl.
CPC . *G06T 1/20* (2013.01); *G06T 1/60* (2013.01)

(58) Field of Classification Search
None
See application file for complete search history.

(56) References Cited

U.S. PATENT DOCUMENTS

| | | | | |
|---|---|---|---|---|
| 5,940,621 A | * | 8/1999 | Caldwell | G06F 8/437 717/147 |
| 6,401,182 B1 | * | 6/2002 | Sweeney | G06F 12/023 711/171 |
| 6,728,722 B1 | * | 4/2004 | Shaylor | G06F 5/065 |
| 8,310,492 B2 | | 11/2012 | McCrary et al. | |
| 8,358,313 B2 | | 1/2013 | Mathur et al. | |

(Continued)

FOREIGN PATENT DOCUMENTS

WO    2013112692    8/2013

OTHER PUBLICATIONS

Appleyard J., "CUDA Pro Tip: Optimize for Pointer Aliasing", [online], [retrieved May 27, 2017], https://devblogs.nvidia.com/parallelforall/cuda-pro-tip-optimize-pointer-aliasing, Aug. 7, 2014. (Year: 2014).*

(Continued)

*Primary Examiner* — Patrick F Valdez
(74) *Attorney, Agent, or Firm* — Tutunjian & Bitetto, P.C.; Randall Bluestone (57) ABSTRACT

A method is provided for buffer allocation on a graphics processing unit. The method includes analyzing, by the graphics processing unit, a program to be executed on the graphics processing unit to determine, for an object in the program, a set of elements in the object that are designated to be accessed during an execution of the program. The method further includes allocating, by the graphics processing unit, a placement of the object in a device buffer on the graphics processing unit based on the set of elements to minimize a number of memory accesses during the execution of the program.

20 Claims, 5 Drawing Sheets

(56) References Cited

U.S. PATENT DOCUMENTS

| | | | | |
|---|---|---|---|---|
| 10,853,350 | B1* | 12/2020 | Sharifi Mehr | H04L 63/10 |
| 2002/0065966 | A1* | 5/2002 | Brief | G06F 13/385 |
| | | | | 710/100 |
| 2002/0073405 | A1* | 6/2002 | Chilimbi | G06F 11/3409 |
| | | | | 717/151 |
| 2004/0215880 | A1* | 10/2004 | Chilimbi | G06F 12/0802 |
| | | | | 711/118 |
| 2011/0063296 | A1* | 3/2011 | Bolz | G06T 1/20 |
| | | | | 345/426 |
| 2013/0051478 | A1* | 2/2013 | Wu | H04N 19/136 |
| | | | | 375/240.25 |
| 2014/0082315 | A1 | 3/2014 | Moser | |
| 2014/0189297 | A1* | 7/2014 | Narvaez | G06F 9/45558 |
| | | | | 712/29 |
| 2014/0282437 | A1* | 9/2014 | Ma | G06F 9/3834 |
| | | | | 717/136 |
| 2015/0271265 | A1* | 9/2015 | Kobayashi | H04L 67/2842 |
| | | | | 709/215 |
| 2015/0304421 | A1* | 10/2015 | Squires | H04L 65/4069 |
| | | | | 709/202 |
| 2016/0041778 | A1* | 2/2016 | Li | G06F 3/061 |
| | | | | 711/114 |

OTHER PUBLICATIONS

Rentzsch J., "Data alignment: Straighten up and fly right", [online], [retrieved May 13, 2017], http://www.ibm.com/developerWorks, Feb. 2005. (Year: 2005).*

Huang, X., "XMALLOC: A Scalable Lock-Free Dynamic Memory Allocator for Many-Core Machines", Thesis Graduate College of University of Illinois at Urbana-Champaign, May 2010, 25 pages.

Wang, et al., "GDM: Device Memory Management for GPGPU Computing" The 2014 ACM International Conference on Measurement and Modeling of Computer Systems, Jun. 2014, pp. 533-545.

List of IBM Patents or Patent Applications Treated as Related dated Oct. 28, 2019, 2 pages.

* cited by examiner

ALLOCATING DEVICE BUFFER ON GPGPU FOR AN OBJECT WITH METADATA USING ACCESS BOUNDARY ALIGNMENT

BACKGROUND

The present invention relates generally to graphics processing and, in particular, to allocating a device buffer on a General Purpose Graphics Processing Unit (GPGPU) for an object with metadata using access boundary alignment.

An object for languages running on a managed runtime (e.g. Java®/Python/Ruby) has metadata that is used for efficient implementation of language features. For example, in the implementation of IBM® Java® for 64-bit platforms, an array object for a primitive type (e.g. int) has a 16-byte header that includes its array length. The array length is used for checking array index bound exceptions.

It is important to reduce the number of accesses from/to L2 cache/global memory to achieve high performance on a General Purpose Graphics Processing Unit (GPGPU). The access from/to global memory takes several hundred cycles. One approach to reduce the number of accesses is to align a starting address of memory accesses within a warp with a memory transaction boundary (e.g. 128-byte granularity). However, such an alignment still does not result in an efficient solution as described below.

That is, an object with metadata is copied from the host processor to a GPU so that a program written in the language running on the managed runtime can be executed while following its language specification. At that time, its execution time may be slower since an unappropriated memory allocation of the object increases the number of memory transactions. For example, in the implementation of IBM® Java® for 64-bit platforms, when a float array is transferred from the host to the GPU using an alignment with a 128-byte boundary, offset 0-15 is used for metadata. In this case, when load instructions in a warp of the program read data from elements 0 to 31 of the array, these loads perform accesses at offset 16 to 143. These accesses are coalesced into two memory transactions. One memory transaction is for offset 0-127. The other memory transaction is for offset 128-255. While we expected one transaction for one 128-byte memory access, it is slower than what we expected.

Thus, there is a need to allocate a device buffer on a GPU for an object with metadata using better access boundary alignment.

SUMMARY

According to an aspect of the present principles, a method is provided for buffer allocation on a graphics processing unit. The method includes analyzing, by the graphics processing unit, a program to be executed on the graphics processing unit to determine, for an object in the program, a set of elements in the object that are designated to be accessed during an execution of the program. The method further includes allocating, by the graphics processing unit, a placement of the object in a device buffer on the graphics processing unit based on the set of elements to minimize a number of memory accesses during the execution of the program.

According to another aspect of the present principles, a computer program product is provided for device buffer allocation on a graphics processing unit. The computer program product includes a non-transitory computer readable storage medium having program instructions embodied therewith. The program instructions are executable by a computer to cause the computer to perform a method. The method includes analyzing, by the graphics processing unit, a program to be executed on the graphics processing unit to determine, for an object in the program, a set of elements in the object that are designated to be accessed during an execution of the program. The method further includes allocating, by the graphics processing unit, a placement of the object in a device buffer on the graphics processing unit based on the set of elements to minimize a number of memory accesses during the execution of the program.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

The present principles are directed to allocating a device buffer on a General Purpose Graphics Processing Unit (GPGPU) for an object with metadata using access boundary alignment. The present principles advantageously reduce the number of accesses from/to L2 cache/global memory to achieve a high performance on the GPGPU.

Figure 1:
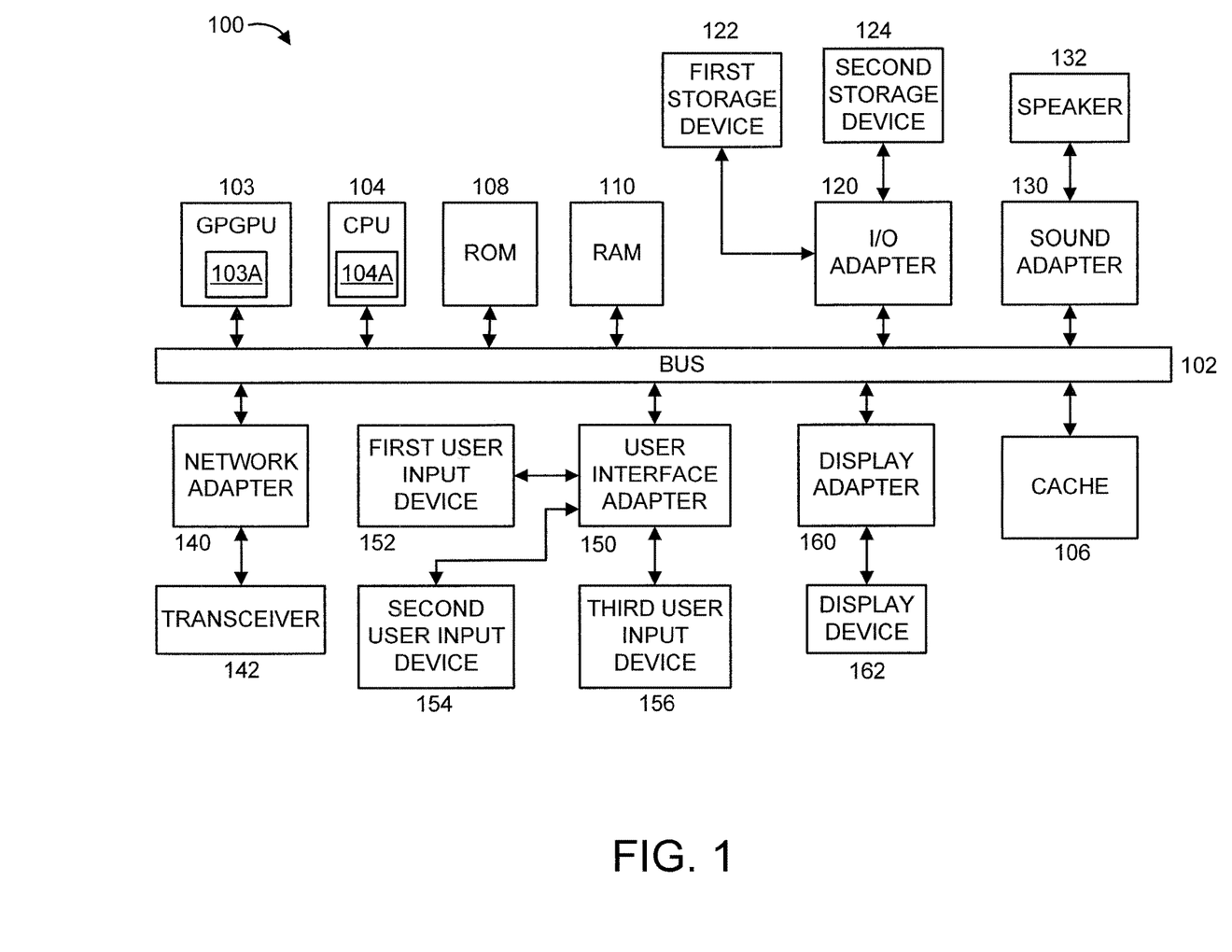
FIG. 1 shows an exemplary processing system 100 to which the present principles may be applied, in accordance with an embodiment of the present principles.

FIG. 1 shows an exemplary processing system 100 to which the present principles may be applied, in accordance with an embodiment of the present principles. The processing system 100 includes at least one processor (CPU) 104 and a GPGPU 103 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. While cache 106 is intended to represent an off-chip cache, CPU 104 can have one or more on-chip caches (e.g., L1, L2, etc., collectively denoted by the reference numeral 104A). Moreover, GPGPU 103 includes at least one buffer 103A.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present principles provided herein.

Figure 2:
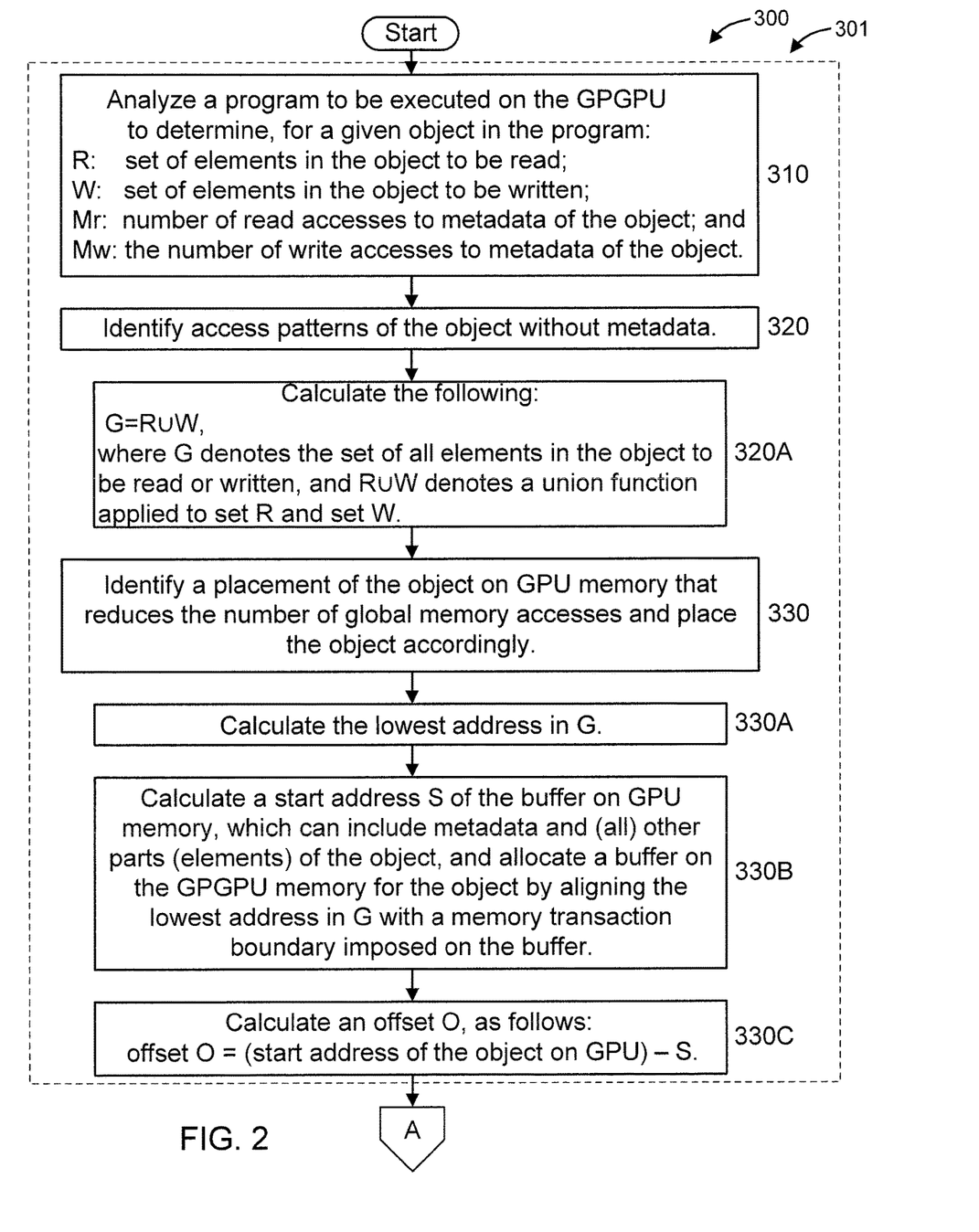
FIGS. 2-3 show an exemplary method 300 for allocating a device buffer on a General Purpose Graphics Processing Unit (GPGPU) for an object with metadata using access boundary alignment, in accordance with an embodiment of the present principles.
Figure 3:
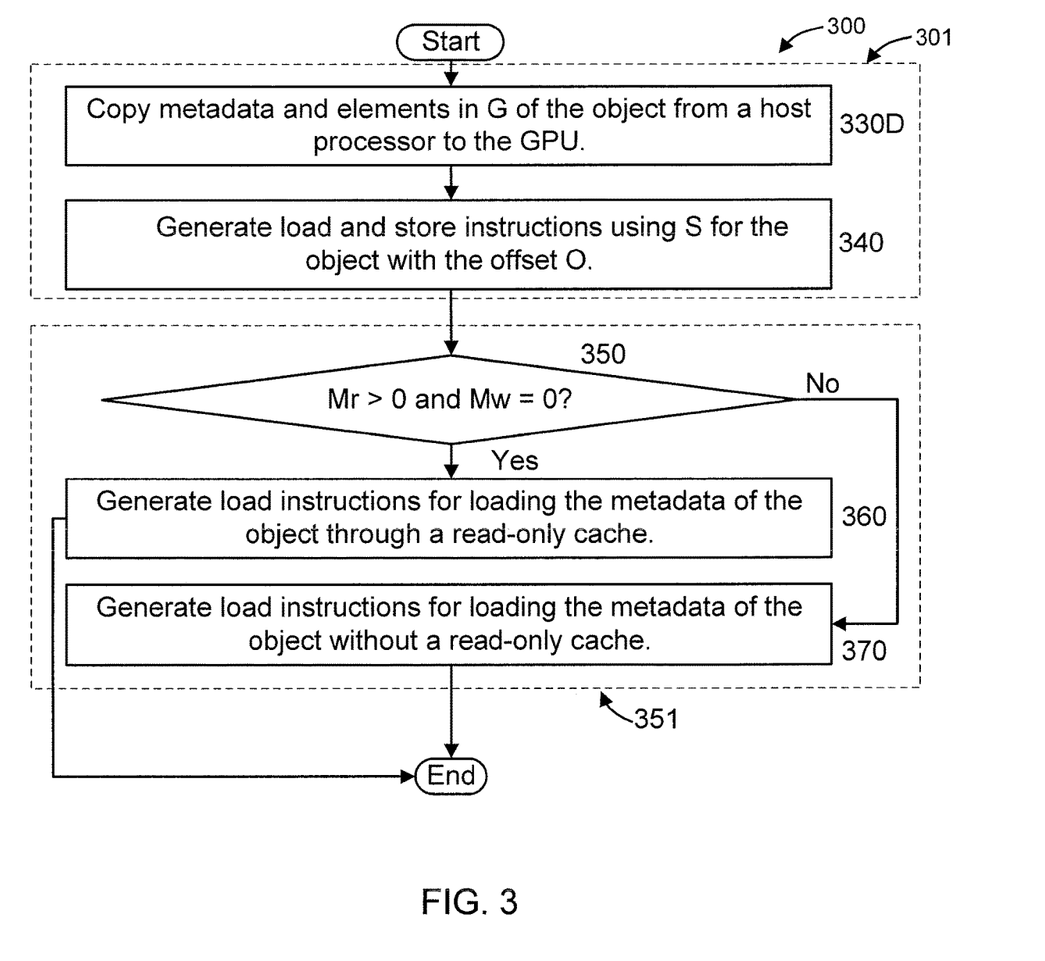

Further, it is to be appreciated that processing system 100 may perform at least part of the method described herein including, for example, at least part of method 300 of FIGS. 2-3.

FIGS. 2-3 show an exemplary method 300 for allocating a device buffer on a General Purpose Graphics Processing Unit (GPGPU) for an object with metadata using access boundary alignment, in accordance with an embodiment of the present principles. Advantageously, method 300 reduces the number of access from/to L2 cache/global memory to achieve high performance on the GPGPU. The method 300 can be considered to include a first portion 301 that relates to allocating a buffer on the GPGPU and a second portion 351 that relates to accessing the metadata of the object once the buffer has been allocated by the first portion 301. The first portion 301 includes steps 310, 320, and 330. In an embodiment, the first portion can further include step 340. The second portion 351 includes steps 350, 360, and 370.

At step 310, analyze a program to be executed on the GPGPU to determine, for a given object in the program:
R: a set of elements in the object to be read;
W: a set of elements in the object to be written;
Mr: the number of read accesses to metadata of the object; and
Mw: the number of write accesses to metadata of the object.

At step 320, identify access patterns of the object without metadata. This step refers to identifying accesses to elements in the object other than metadata. In an embodiment, step 320 includes step 320A.

At step 320A, calculate the following:

$G = R \cup W$, where G denotes the set of all elements in the object to be read or written, and ∪ denotes a union function applied to set R and set W.

At step 330, identify a placement of the object on GPU memory (e.g., a particular location in a buffer from among a set of possible (available) locations and/or a particular buffer from among a set of possible (available) buffers) that reduces the number of global memory accesses and place the object accordingly. In an embodiment, step 330 involves steps 330A-D.

At step 330A, calculate the lowest address in G.

At step 330B, calculate a starting address S (which, in an embodiment, can simply be the next available address in the memory) of the buffer on GPU memory, which can include metadata and (all) other parts (elements) of the object, and allocate a buffer on the GPGPU memory for the object by aligning the lowest address in G with a memory transaction boundary imposed on the buffer. The memory transaction boundary can be, for example, but is not limited to, 128. Thus, a region with the starting address S includes the entirety of the object starting therefrom, that is, the metadata parts and the non-metadata parts, where the non-metadata parts include sets R and W and as well as any elements that are not to be read or written during the execution of the program that includes the object therein).

At step 330C, calculate an offset O, as follows:

offset $O$=(starting address of the object on GPU)−$S$.

At step 330D, copy metadata and elements in G of the object from a host processor to the GPU.

At step 340, generate load and store instructions using S for the object with the offset O.

At step 350, determine if Mr>0 and Mw=0. If so, then the method proceeds to step 360. Otherwise, the method proceeds to step 370.

At step 360, generate load instructions for loading the metadata of the object through a read-only cache. Then, the method for code generation is terminated.

At step 370, generate load instructions for loading the metadata of the object without a read-only cache. Then, the method is terminated.

Figure 4:
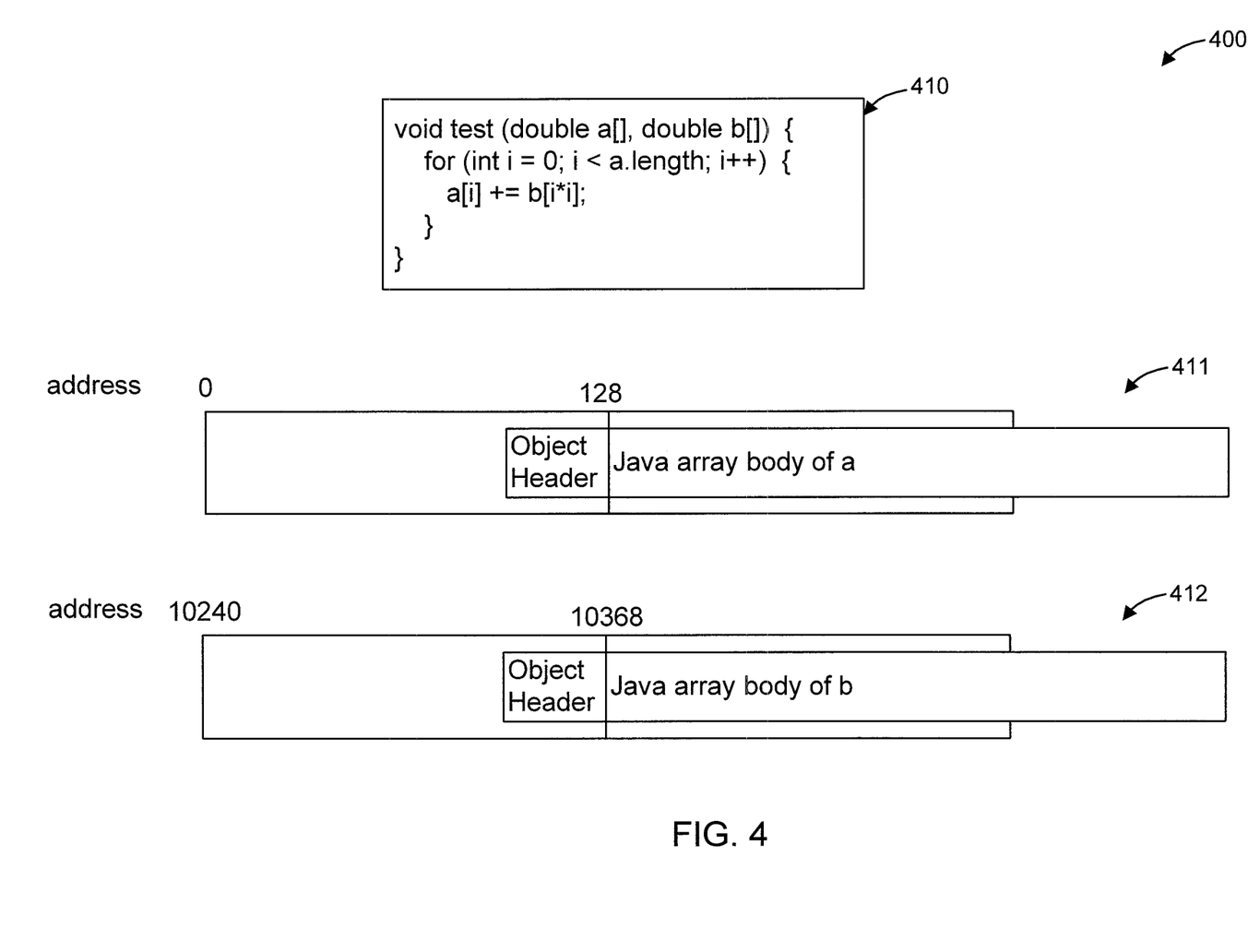
FIG. 4 shows an exemplary application 400 of the present principles, in accordance with an embodiment of the present principles.

FIG. 4 shows an exemplary application 400 of the present principles, in accordance with an embodiment of the present principles.

In the exemplary application 400, a source program 410 is analyzed according to method 300. The source program 410 includes an object a[ ] and an object b[ ].

The allocated device buffers for object a[ ] and object b[ ] using method 300 are 411 and 412, respectively. For object a[ ], addresses 0-127 includes the object header for object a[ ], with the Java array body of a[ ] starting at address 128. For object b[ ], addresses 10240-10367 include the object header for object b[ ], with the Java array body of b[ ] starting at 10368.

Figure 5:
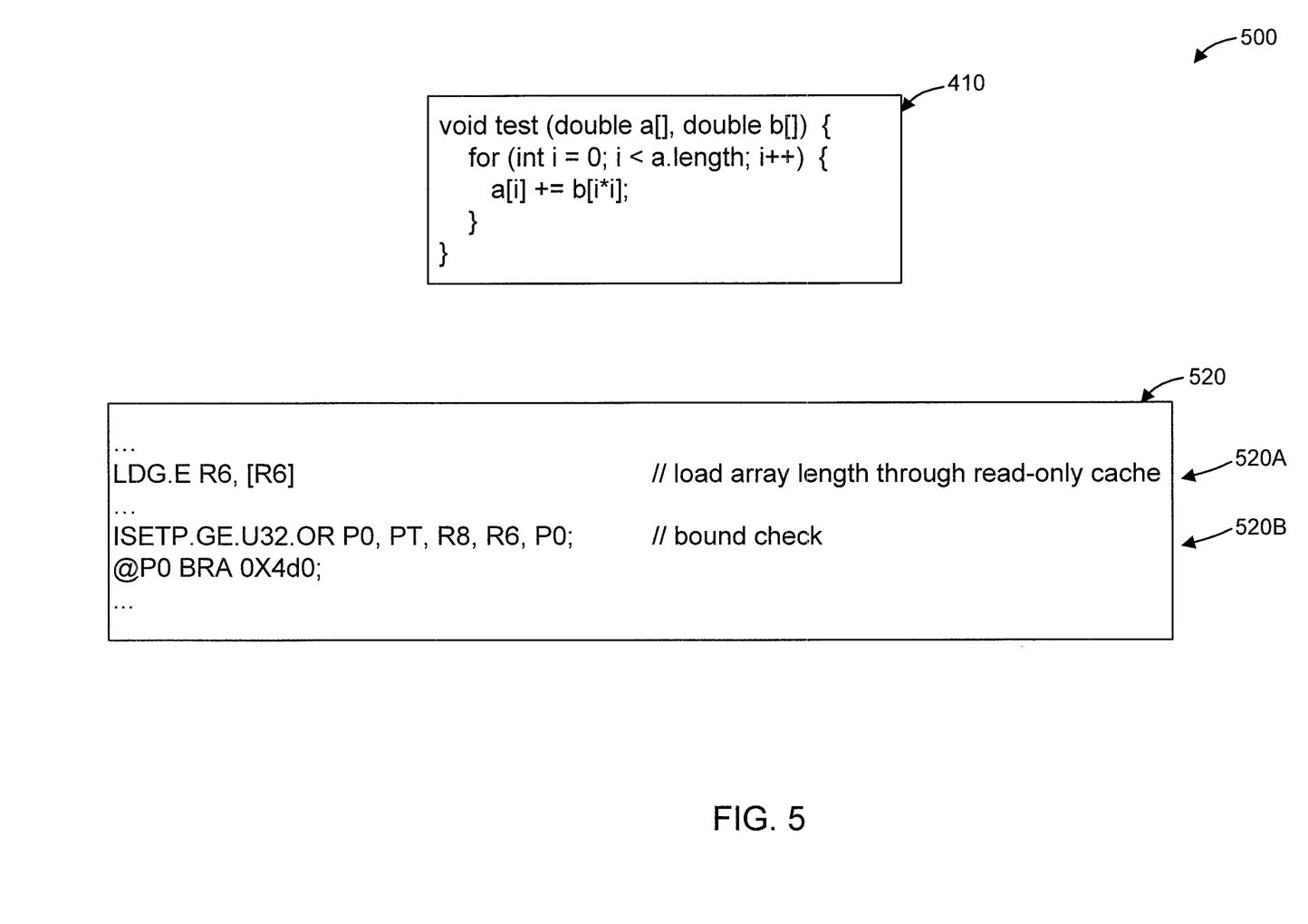
FIG. 5 shows another exemplary application 500 of the present principles, in accordance with an embodiment of the present principles.

FIG. 5 shows another exemplary application 500 of the present principles, in accordance with an embodiment of the present principles.

In the exemplary application 500, the source program 410 (the same one from FIG. 4) is further analyzed according to method 300. Pseudocode 520 is then generated for accessing b.length, as shown in source program 410, using method 300. The pseudocode 520 includes a portion 520A for loading the array length through a read-only cache, and a portion 520B that forms a bound check. Further regarding the bound check, the following applies:

Set true to P1 if R8>=R6. If P1 is true, "BRA 0x4d0" is executed. Thus, a process for array bound exception will be executed.

While the exemplary application 500 generates pseudocode 520 for accessing b.length, it is to be appreciated that the present principles can be applied so as to generate pseudocode for accessing a.length. These and other variations in applying the present principles are readily determined by one of ordinary skill in the art, given the teachings of the present principles provided herein, while maintaining the spirit of the present principles.

It is to be appreciated that the present principles provide a significant reduction in execution time. For example, when we built a binary for the matrix multiplication program by using a Java® Just-In-Time compiler with Method1 and measured the execution time of GPU code on NVIDIA K40m, we measured reduction of execution time by 32.9%

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer-implemented method for buffer allocation on a memory of a graphics processing unit, comprising:
    analyzing, by the graphics processing unit, a program to be executed on the graphics processing unit to determine, for an object in the program, a set of elements in the object that are designated to be accessed during an execution of the program and identifying access patterns of each of one or more metadata and non-metadata elements in the object during the execution of the program; and
    buffering using the graphics processing unit by allocating a placement of the object in a device buffer on the graphics processing unit based on the set of elements to minimize a number of memory accesses to and from global memory during the execution of the program, the device buffer being allocated for the object with an alignment of a lowest address in the set of elements in the device buffer with a memory transaction boundary.

2. The method of claim 1, wherein said analyzing step identifies the set of elements to include a set of elements in the object to be read during the execution of the program and a set of elements in the object to be written during the execution of the program.

3. The method of claim 1, wherein said analyzing step further comprises:
    identifying a number of read accesses to metadata of the object; and
    identifying a number of write accesses to the metadata of the object.

4. The method of claim 3, further comprising generating, by the graphics processing unit, load instructions for loading the metadata of the object through a read-only cache, responsive to the number of read accesses to the metadata of the object being greater than zero, and the number of write accesses to the metadata of the object being equal to zero.

5. The method of claim 1, wherein the graphics processing unit is a general purpose graphics processing unit.

6. The method of claim 1, further comprising executing, by the graphics processing unit, the program from the device buffer on the graphic processing unit.

7. The method of claim 1, wherein the placement of the object in the device buffer is allocated for the object with an alignment of a lowest address of the set of elements in the device buffer with a memory transaction boundary.

8. The method of claim 7, wherein the placement of the object in the device buffer is allocated to be further aligned with a memory transaction boundary imposed on the device buffer.

9. The method of claim 1, wherein said allocating step comprises determining a starting address of the device buffer from which to commence storage of the set of elements and metadata corresponding thereto.

10. The method of claim 9, wherein non-metadata elements that lack a designation to be accessed during the execution of the program are stored along with the set of elements and the metadata corresponding thereto.

11. The method of claim 9, further comprising calculating, by a processor, an offset value as a difference between a starting address of the object on the graphics processing unit and the starting address of the device buffer.

12. The method of claim 11, further comprising generating, by the graphics processing unit, load and store instructions using the starting address of the device buffer with the offset.

13. A computer program product for device buffer allocation on a memory of a graphics processing unit, the computer program product comprising a non-transitory computer readable storage medium having program instructions embodied therewith, the program instructions executable by a computer to cause the computer to perform a method comprising:
    analyzing, by the graphics processing unit, a program to be executed on the graphics processing unit to determine, for an object in the program, a set of elements in the object that are designated to be accessed during an execution of the program and identifying access patterns of each of one or more metadata and non-metadata elements in the object during the execution of the program; and
    buffering, using the graphics processing unit, by allocating a placement of the object in a device buffer on the graphics processing unit based on the set of elements to minimize a number of memory accesses to and from global memory during the execution of the program, the device buffer being allocated for the object with an alignment of a lowest address in the set of elements in the device buffer with a memory transaction boundary.

14. The method of claim 13, wherein said analyzing step identifies the set of elements to include a set of elements in the object to be read during the execution of the program and a set of elements in the object to be written during the execution of the program.

15. The method of claim 13, wherein said analyzing step further comprises:
identifying a number of read accesses to metadata of the object; and
identifying a number of write accesses to the metadata of the object.

16. The method of claim 15, further comprising generating, by the graphics processing unit, load instructions for loading the metadata of the object through a read-only cache, responsive to the number of read accesses to the metadata of the object being greater than zero, and the number of write accesses to the metadata of the object being equal to zero.

17. The method of claim 13, wherein the graphics processing unit is a general purpose graphics processing unit.

18. The method of claim 13, further comprising executing, by the graphics processing unit, the program from the device buffer on the graphic processing unit.

19. The method of claim 13, wherein the placement of the object in the device buffer is allocated for the object with an alignment of a lowest address of the set of elements in the device buffer with a memory transaction boundary.

20. An apparatus for device buffer allocation on a memory of a graphics processing unit, comprising:
a processor device operatively coupled to a memory, the processor device being configured for:
analyzing, by the graphics processing unit, a program to be executed on the graphics processing unit to determine, for an object in the program, a set of elements in the object that are designated to be accessed during an execution of the program and identifying access patterns of each of one or more metadata and non-metadata elements in the object during the execution of the program; and
buffering, using the graphics processing unit, by allocating a placement of the object in a device buffer on the graphics processing unit based on the set of elements to minimize a number of memory accesses to and from global memory during the execution of the program, the device buffer being allocated for the object with an alignment of a lowest address in the set of elements in the device buffer with a memory transaction boundary.

* * * * *